United States Patent
Yona et al.

(10) Patent No.: US 10,505,818 B1
(45) Date of Patent: Dec. 10, 2019

(54) METHODS FOR ANALYZING AND LOAD BALANCING BASED ON SERVER HEALTH AND DEVICES THEREOF

(71) Applicant: F5 Networks, Inc., Seattle, WA (US)

(72) Inventors: Shlomo Yona, Kfar Yona (IL); Maydan Wienreb, Nez-Ziona (IL); Michael Kapelevich, Raanana (IL); Peter Finkelshtein, Kiryat Yam (IL)

(73) Assignee: F5 Networks. Inc., Seattle, WA (US)

( * ) Notice: Subject to any disclaimer, the term of this patent is extended or adjusted under 35 U.S.C. 154(b) by 204 days.

(21) Appl. No.: 15/146,596

(22) Filed: May 4, 2016

Related U.S. Application Data (60) Provisional application No. 62/156,973, filed on May 5, 2015.

(51) Int. Cl.
  *H04L 12/24* (2006.01)
  *H04L 12/803* (2013.01)
  *H04L 12/26* (2006.01)

(52) U.S. Cl.
  CPC .......... *H04L 41/147* (2013.01); *H04L 47/125* (2013.01); *H04L 43/08* (2013.01)

(58) Field of Classification Search
  CPC ...... H04L 41/147; H04L 47/125; H04L 43/08
  See application file for complete search history.

(56) References Cited

U.S. PATENT DOCUMENTS

| | | | |
|---|---|---|---|
| 3,950,735 A | 4/1976 | Patel | |
| 4,644,532 A | 2/1987 | George et al. | |
| 4,897,781 A | 1/1990 | Chang et al. | |
| 4,965,772 A | 10/1990 | Daniel et al. | |
| 5,023,826 A | 6/1991 | Patel | |
| 5,053,953 A | 10/1991 | Patel | |
| 5,167,024 A | 11/1992 | Smith et al. | |
| 5,282,201 A | 1/1994 | Frank et al. | |

(Continued)

FOREIGN PATENT DOCUMENTS

| | | |
|---|---|---|
| CA | 2080530 | 4/1994 |
| EP | 0605088 | 7/1994 |

(Continued)

OTHER PUBLICATIONS

F5 Networks, Inc., "BIG-IP® TMOS® : Concepts", Manual, Nov. 11, 2014, pp. 1-148, Version 11.5.

(Continued)

*Primary Examiner* — Bryan Lee
(74) *Attorney, Agent, or Firm* — Pepper Hamilton LLP (57) ABSTRACT

A method, non-transitory computer readable medium, and health analysis apparatus that monitors network traffic exchanged with a plurality of server devices in a server pool to obtain signal data regarding a plurality of signals associated with the network traffic. A determination is made when there is a sever health anomaly for one or more of the server devices based on an application of a server health prediction model to the signal data. The server health prediction model includes a plurality of predictive health targets each based at least in part on historical signal data for one or more of the signals and having an associated threshold value. A mitigation action is initiated when the determining indicates there is a sever health anomaly for one or more of the server devices.

20 Claims, 4 Drawing Sheets

(56) References Cited

U.S. PATENT DOCUMENTS

| | | |
|---|---|---|
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,550,816 A | 8/1996 | Hardwick et al. |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,623,490 A | 4/1997 | Richter et al. |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 5,991,302 A | 11/1999 | Beri et al. |
| 5,995,491 A | 11/1999 | Richter et al. |
| 6,006,260 A | 12/1999 | Barrick, Jr. |
| 6,006,264 A | 12/1999 | Colby et al. |
| 6,026,452 A | 2/2000 | Pitts |
| 6,026,500 A | 2/2000 | Topff et al. |
| 6,028,857 A | 2/2000 | Poor |
| 6,029,175 A | 2/2000 | Chow et al. |
| 6,041,365 A | 3/2000 | Kleinerman |
| 6,047,356 A | 4/2000 | Anderson et al. |
| 6,051,169 A | 4/2000 | Brown et al. |
| 6,067,558 A | 5/2000 | Wendt et al. |
| 6,078,956 A | 6/2000 | Bryant et al. |
| 6,085,234 A | 7/2000 | Pitts et al. |
| 6,092,196 A | 7/2000 | Reiche |
| 6,104,706 A | 8/2000 | Richter et al. |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,154,777 A | 11/2000 | Ebrahim |
| 6,157,950 A | 12/2000 | Krishnan |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,259,405 B1 | 7/2001 | Stewart et al. |
| 6,260,070 B1 | 7/2001 | Shah |
| 6,263,368 B1 | 7/2001 | Martin |
| 6,279,037 B1 | 8/2001 | Tams |
| 6,289,012 B1 | 9/2001 | Harrington et al. |
| 6,292,832 B1 | 9/2001 | Shah et al. |
| 6,298,380 B1 | 10/2001 | Coile et al. |
| 6,304,913 B1 | 10/2001 | Rune |
| 6,327,622 B1 | 12/2001 | Jindal et al. |
| 6,330,574 B1 | 12/2001 | Murashita |
| 6,338,082 B1 | 1/2002 | Schneider |
| 6,343,324 B1 | 1/2002 | Hubis et al. |
| 6,347,339 B1 | 2/2002 | Morris et al. |
| 6,353,848 B1 | 3/2002 | Morris |
| 6,360,270 B1 | 3/2002 | Cherkasova et al. |
| 6,363,056 B1 | 3/2002 | Beigi et al. |
| 6,370,527 B1 | 4/2002 | Singhal |
| 6,374,300 B2 | 4/2002 | Masters |
| 6,389,462 B1 | 5/2002 | Cohen et al. |
| 6,393,474 B1 | 5/2002 | Eichert et al. |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,480,476 B1 | 11/2002 | Willars |
| 6,484,261 B1 | 11/2002 | Wiegel |
| 6,490,624 B1 | 12/2002 | Sampson et al. |
| 6,505,244 B1 | 1/2003 | Natarajan et al. |
| 6,510,135 B1 | 1/2003 | Almulhem et al. |
| 6,510,458 B1 | 1/2003 | Berstis et al. |
| 6,513,061 B1 | 1/2003 | Ebata et al. |
| 6,514,085 B2 | 2/2003 | Slattery et al. |
| 6,519,643 B1 | 2/2003 | Foulkes et al. |
| 6,542,936 B1 | 4/2003 | Mayle et al. |
| 6,560,230 B1 | 5/2003 | Li et al. |
| 6,578,069 B1 | 6/2003 | Homann et al. |
| 6,578,076 B1 | 6/2003 | Putzolu |
| 6,601,084 B1 | 7/2003 | Bhaskaran et al. |
| 6,615,267 B1 | 9/2003 | Whalen et al. |
| 6,631,422 B1 | 10/2003 | Althaus et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,346 B1 | 11/2003 | Mahalingaiah et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,701,415 B1 | 3/2004 | Hendren, III |
| 6,708,187 B1 | 3/2004 | Shanumgam et al. |
| 6,708,220 B1 | 3/2004 | Olin |
| 6,718,380 B1 | 4/2004 | Mohaban et al. |
| 6,728,704 B2 | 4/2004 | Mao et al. |
| 6,738,357 B1 | 5/2004 | Richter et al. |
| 6,738,933 B2 | 5/2004 | Fraenkel et al. |
| 6,742,045 B1 | 5/2004 | Albert et al. |
| 6,744,776 B1 | 6/2004 | Kalkunte et al. |
| 6,751,663 B1 | 6/2004 | Farrell et al. |
| 6,754,215 B1 | 6/2004 | Arikawa et al. |
| 6,754,228 B1 | 6/2004 | Ludwig |
| 6,754,699 B2 | 6/2004 | Swildens et al. |
| 6,760,337 B1 | 7/2004 | Snyder, II et al. |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,795,860 B1 | 9/2004 | Shah |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,826,698 B1 | 11/2004 | Minkin et al. |
| 6,829,238 B2 | 12/2004 | Tokuyo et al. |
| 6,857,009 B1 | 2/2005 | Fereria |
| 6,862,282 B1 | 3/2005 | Oden |
| 6,865,593 B1 | 3/2005 | Reshef et al. |
| 6,868,082 B1 | 3/2005 | Allen, Jr. et al. |
| 6,868,447 B1 | 3/2005 | Slaughter et al. |
| 6,871,221 B1 | 3/2005 | Styles |

(56) References Cited

U.S. PATENT DOCUMENTS

| | | | |
|---|---|---|---|
| 6,876,629 B2 | 4/2005 | Beshai et al. |
| 6,876,654 B1 | 4/2005 | Hedge |
| 6,880,017 B1 | 4/2005 | Marce et al. |
| 6,883,137 B1 | 4/2005 | Girardot et al. |
| 6,888,836 B1 | 5/2005 | Cherkasova |
| 6,904,040 B2 | 6/2005 | Salapura et al. |
| 6,914,881 B1 | 7/2005 | Mansfield et al. |
| 6,928,082 B2 | 8/2005 | Liu et al. |
| 6,928,518 B2 | 8/2005 | Talagala |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,970,475 B1 | 11/2005 | Fraser et al. |
| 6,970,924 B1 | 11/2005 | Chu et al. |
| 6,973,490 B1 | 12/2005 | Robertsono et al. |
| 6,975,592 B1 | 12/2005 | Seddigh et al. |
| 6,986,040 B1 | 1/2006 | Kramer et al. |
| 6,987,763 B2 | 1/2006 | Rochberger et al. |
| 6,990,074 B2 | 1/2006 | Wan et al. |
| 6,990,114 B1 | 1/2006 | Erimli et al. |
| 7,003,564 B2 | 2/2006 | Greuel et al. |
| 7,006,502 B2 | 2/2006 | Lin |
| 7,007,092 B2 | 2/2006 | Peiffer |
| 7,020,713 B1 | 3/2006 | Shah et al. |
| 7,023,974 B1 | 4/2006 | Brannam et al. |
| 7,035,212 B1 | 4/2006 | Mittal et al. |
| 7,039,061 B2 | 5/2006 | Connor et al. |
| 7,058,633 B1 | 6/2006 | Gnagy et al. |
| 7,065,482 B2 | 6/2006 | Shorey et al. |
| 7,072,800 B1 | 7/2006 | Fernandez et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,491 B2 | 8/2006 | Feinberg et al. |
| 7,113,993 B1 | 9/2006 | Cappiello et al. |
| 7,113,996 B2 | 9/2006 | Kronenberg |
| 7,127,625 B2 | 10/2006 | Farkas et al. |
| 7,133,863 B2 | 11/2006 | Teng et al. |
| 7,133,944 B2 | 11/2006 | Song et al. |
| 7,139,792 B1 | 11/2006 | Mishra et al. |
| 7,155,722 B1 | 12/2006 | Hills |
| 7,161,904 B2 | 1/2007 | Hussain et al. |
| 7,185,359 B2 | 2/2007 | Schmidt et al. |
| 7,191,163 B2 | 3/2007 | Herrera et al. |
| 7,228,359 B1 | 6/2007 | Monteiro |
| 7,228,422 B2 | 6/2007 | Morioka et al. |
| 7,236,491 B2 | 6/2007 | Tsao et al. |
| 7,240,100 B1 | 7/2007 | Wein et al. |
| 7,257,633 B2 | 8/2007 | Masputra et al. |
| 7,283,470 B1 | 10/2007 | Sindhu et al. |
| 7,287,082 B1 | 10/2007 | O'Toole, Jr. |
| 7,292,541 B1 | 11/2007 | Cs |
| 7,295,827 B2 | 11/2007 | Liu et al. |
| 7,296,263 B1 | 11/2007 | Jacob |
| 7,308,475 B1 | 12/2007 | Pruitt et al. |
| 7,308,703 B2 | 12/2007 | Wright et al. |
| 7,308,709 B1 | 12/2007 | Brezak et al. |
| 7,310,339 B1 | 12/2007 | Powers et al. |
| 7,321,926 B1 | 1/2008 | Zhang et al. |
| 7,324,533 B1 | 1/2008 | DeLiberato et al. |
| 7,340,571 B2 | 3/2008 | Saze |
| 7,343,413 B2 | 3/2008 | Gilde et al. |
| 7,349,391 B2 | 3/2008 | Ben-Dor et al. |
| 7,373,438 B1 | 5/2008 | DeBergalis et al. |
| 7,398,552 B2 | 7/2008 | Pardee et al. |
| 7,409,440 B1 | 8/2008 | Jacob |
| 7,433,962 B2 | 10/2008 | Janssen et al. |
| 7,454,480 B2 | 11/2008 | Labio et al. |
| 7,454,503 B2 | 11/2008 | Childress |
| 7,333,999 B1 | 12/2008 | Njemanze |
| 7,490,162 B1 | 2/2009 | Masters |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,516,492 B1 | 4/2009 | Nisbet et al. |
| 7,522,581 B2 | 4/2009 | Acharya et al. |
| 7,526,541 B2 | 4/2009 | Roese et al. |
| 7,555,608 B2 | 6/2009 | Naik et al. |
| 7,558,197 B1 | 7/2009 | Sindhu et al. |
| 7,577,723 B2 | 8/2009 | Matsuda et al. |
| 7,580,356 B1 | 8/2009 | Mishra |
| 7,580,971 B1 | 8/2009 | Gollapudi et al. |
| 7,624,424 B2 | 11/2009 | Morita et al. |
| 7,640,347 B1 | 12/2009 | Sloat et al. |
| 7,644,137 B2 | 1/2010 | Bozak et al. |
| 7,647,203 B1 | 1/2010 | Herz |
| 7,650,331 B1 | 1/2010 | Dean et al. |
| 7,668,166 B1 | 2/2010 | Rekhter et al. |
| 7,675,868 B2 | 3/2010 | Balonado |
| 7,684,423 B2 | 3/2010 | Tripathi et al. |
| 7,689,710 B2 | 3/2010 | Tang et al. |
| 7,698,458 B1 | 4/2010 | Liu et al. |
| 7,706,261 B2 | 4/2010 | Sun et al. |
| 7,720,954 B2 | 5/2010 | Raja et al. |
| 7,724,657 B2 | 5/2010 | Rao et al. |
| 7,725,093 B2 | 5/2010 | Sengupta et al. |
| 7,769,860 B1 | 8/2010 | Assadzadeh |
| 7,778,187 B2 | 8/2010 | Chaturvedi et al. |
| 7,801,978 B1 | 9/2010 | Susai et al. |
| 7,808,913 B2 | 10/2010 | Ansari et al. |
| 7,822,839 B1 | 10/2010 | Pruitt et al. |
| 7,831,662 B2 | 11/2010 | Clark et al. |
| 7,844,839 B2 | 11/2010 | Palmer et al. |
| 7,861,085 B1 | 12/2010 | Case et al. |
| 7,861,102 B1 | 12/2010 | Ranganathan |
| 7,873,060 B2 | 1/2011 | Luo |
| 7,876,677 B2 | 1/2011 | Cheshire |
| 7,885,398 B2 | 2/2011 | Chandra |
| 7,895,653 B2 | 2/2011 | Calo et al. |
| 7,903,554 B1 | 3/2011 | Manur et al. |
| 7,908,245 B2 | 3/2011 | Nakano et al. |
| 7,908,314 B2 | 3/2011 | Yamaguchi et al. |
| 7,925,908 B2 | 4/2011 | Kim |
| 7,930,365 B2 | 4/2011 | Dixit et al. |
| 7,933,496 B2 | 4/2011 | Livshits et al. |
| 7,945,908 B1 | 5/2011 | Waldspurger et al. |
| 7,958,222 B1 | 6/2011 | Pruitt et al. |
| 7,984,141 B2 | 7/2011 | Gupta et al. |
| 7,984,500 B1 | 7/2011 | Khanna et al. |
| 8,024,443 B1 | 9/2011 | Jacob |
| 8,037,528 B2 | 10/2011 | Williams et al. |
| 8,064,342 B2 | 11/2011 | Badger |
| 8,069,225 B2 | 11/2011 | McCanne et al. |
| 8,103,781 B1 | 1/2012 | Wu et al. |
| 8,130,650 B2 | 3/2012 | Allen, Jr. et al. |
| 8,149,819 B2 | 4/2012 | Kobayashi et al. |
| 8,155,128 B2 | 4/2012 | Balyan et al. |
| 8,171,124 B2 | 5/2012 | Kondamuru |
| 8,189,567 B2 | 5/2012 | Kavanagh et al. |
| 8,190,769 B1 | 5/2012 | Shukla et al. |
| 8,199,757 B2 | 6/2012 | Pani et al. |
| 8,205,246 B2 | 6/2012 | Shatzkamer et al. |
| 8,230,055 B2 | 7/2012 | Kondamuru et al. |
| 8,239,954 B2 | 8/2012 | Wobber et al. |
| 8,271,620 B2 | 9/2012 | Witchey |
| 8,274,895 B2 | 9/2012 | Rahman et al. |
| 8,321,908 B2 | 11/2012 | Gai et al. |
| 8,351,333 B2 | 1/2013 | Rao et al. |
| 8,380,854 B2 | 2/2013 | Szabo |
| 8,396,836 B1 | 3/2013 | Ferguson et al. |
| 8,417,817 B1 | 4/2013 | Jacobs |
| 8,422,365 B2 | 4/2013 | Phillips et al. |
| 8,447,871 B1 | 5/2013 | Szabo |
| 8,447,970 B2 | 5/2013 | Klein et al. |
| 8,452,876 B1 | 5/2013 | Williams et al. |
| 8,463,850 B1 | 6/2013 | McCann |
| 8,464,265 B2 | 6/2013 | Worley |
| 8,468,267 B2 | 6/2013 | Yigang |
| 8,484,348 B2 | 7/2013 | Subramanian et al. |
| 8,359,224 B2 | 9/2013 | Henderson et al. |
| 8,560,693 B1 | 10/2013 | Wang et al. |
| 8,566,474 B2 | 10/2013 | Kanode et al. |

(56) References Cited

U.S. PATENT DOCUMENTS

| | | |
|---|---|---|
| 8,578,050 B2 | 11/2013 | Craig et al. |
| 8,601,000 B1 | 12/2013 | Stefani et al. |
| 8,606,921 B2 | 12/2013 | Vasquez et al. |
| 8,612,612 B1 | 12/2013 | Dukes et al. |
| 8,615,022 B2 | 12/2013 | Harrison et al. |
| 8,646,067 B2 | 2/2014 | Agarwal et al. |
| 8,665,868 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Glide et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,830,874 B2 | 9/2014 | Cho et al. |
| 8,838,817 B1 | 9/2014 | Biswas |
| 8,873,753 B2 | 10/2014 | Parker |
| 8,875,274 B2 | 10/2014 | Montemurro et al. |
| 8,879,431 B2 | 11/2014 | Ridel et al. |
| 8,886,981 B1 | 11/2014 | Baumann et al. |
| 8,908,545 B1 | 12/2014 | Chen et al. |
| 8,959,215 B2 | 2/2015 | Koponen et al. |
| 9,036,529 B2 | 5/2015 | Erickson et al. |
| 9,037,166 B2 | 5/2015 | de Wit et al. |
| 9,083,760 B1 | 7/2015 | Hughes et al. |
| 9,114,326 B2 | 8/2015 | Arora et al. |
| 9,143,451 B2 | 9/2015 | Amdahl et al. |
| 9,244,843 B1 | 1/2016 | Michels et al. |
| 9,497,106 B2 * | 11/2016 | Khanal ............... H04L 45/021 |
| 9,505,712 B2 | 11/2016 | Leighton et al. |
| 9,535,775 B2 * | 1/2017 | Huang ............... H04L 67/1012 |
| 9,709,805 B2 | 7/2017 | Shepard |
| 9,745,800 B2 | 8/2017 | Madnick et al. |
| 9,905,829 B2 | 2/2018 | Poor |
| 9,906,913 B2 | 2/2018 | Colby et al. |
| 9,910,858 B2 | 3/2018 | Leighton |
| 9,939,373 B2 | 4/2018 | Sturm et al. |
| 9,964,967 B2 | 5/2018 | Milsson et al. |
| 2001/0007560 A1 | 7/2001 | Masuda et al. |
| 2001/0009554 A1 | 7/2001 | Katseff et al. |
| 2001/0023442 A1 | 9/2001 | Masters |
| 2002/0010757 A1 | 1/2002 | Granik et al. |
| 2002/0010783 A1 | 1/2002 | Primak et al. |
| 2002/0012352 A1 | 1/2002 | Hansson et al. |
| 2002/0032777 A1 | 3/2002 | Kawata et al. |
| 2002/0038360 A1 | 3/2002 | Andrews et al. |
| 2002/0046291 A1 | 4/2002 | O'Callaghan et al. |
| 2002/0049842 A1 | 4/2002 | Huetsch et al. |
| 2002/0052928 A1 | 5/2002 | Stern et al. |
| 2002/0059428 A1 | 5/2002 | Susai et al. |
| 2002/0065848 A1 | 5/2002 | Walker et al. |
| 2002/0072048 A1 | 6/2002 | Slattery et al. |
| 2002/0083067 A1 | 6/2002 | Tamayo et al. |
| 2002/0087571 A1 | 7/2002 | Stapel et al. |
| 2002/0087744 A1 | 7/2002 | Kitchin |
| 2002/0095498 A1 | 7/2002 | Chanda et al. |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0112061 A1 | 8/2002 | Shih et al. |
| 2002/0138615 A1 | 9/2002 | Schmelling |
| 2002/0143819 A1 | 10/2002 | Han et al. |
| 2002/0143852 A1 | 10/2002 | Guo et al. |
| 2002/0161913 A1 | 10/2002 | Gonzalez et al. |
| 2002/0162118 A1 | 10/2002 | Levy et al. |
| 2002/0174216 A1 | 11/2002 | Shorey et al. |
| 2002/0188753 A1 | 12/2002 | Tang et al. |
| 2002/0194112 A1 | 12/2002 | DePinto et al. |
| 2002/0194317 A1 | 12/2002 | Kanada et al. |
| 2002/0194342 A1 | 12/2002 | Lu et al. |
| 2002/0198956 A1 | 12/2002 | Dunshea et al. |
| 2002/0198993 A1 | 12/2002 | Cudd et al. |
| 2003/0005172 A1 | 1/2003 | Chessell |
| 2003/0009528 A1 | 1/2003 | Sharif et al. |
| 2003/0018450 A1 | 1/2003 | Carley |
| 2003/0018585 A1 | 1/2003 | Butler et al. |
| 2003/0018760 A1 | 1/2003 | Putzolu et al. |
| 2003/0034905 A1 | 2/2003 | Anton et al. |
| 2003/0037070 A1 | 2/2003 | Marston |
| 2003/0046291 A1 | 3/2003 | Fascenda |
| 2003/0051045 A1 | 3/2003 | Connor |
| 2003/0055723 A1 | 3/2003 | English |
| 2003/0065497 A1 | 4/2003 | Rhoads |
| 2003/0065653 A1 | 4/2003 | Overton et al. |
| 2003/0065762 A1 | 4/2003 | Stolorz et al. |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0074301 A1 | 4/2003 | Solomon |
| 2003/0086415 A1 | 5/2003 | Bernhard et al. |
| 2003/0105807 A1 | 6/2003 | Thompson et al. |
| 2003/0105846 A1 | 6/2003 | Zhao et al. |
| 2003/0105983 A1 | 6/2003 | Brakmo et al. |
| 2003/0108000 A1 | 6/2003 | Chaney et al. |
| 2003/0108002 A1 | 6/2003 | Chaney et al. |
| 2003/0108052 A1 | 6/2003 | Inoue et al. |
| 2003/0120948 A1 | 6/2003 | Schmidt et al. |
| 2003/0128708 A1 | 7/2003 | Inoue et al. |
| 2003/0130945 A1 | 7/2003 | Force |
| 2003/0139934 A1 | 7/2003 | Mandera |
| 2003/0145062 A1 | 7/2003 | Sharma et al. |
| 2003/0145233 A1 | 7/2003 | Poletto et al. |
| 2003/0156586 A1 | 8/2003 | Lee et al. |
| 2003/0163576 A1 | 8/2003 | Janssen et al. |
| 2003/0179755 A1 | 9/2003 | Fraser |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0195962 A1 | 10/2003 | Kikuchi et al. |
| 2003/0208596 A1 | 11/2003 | Carolan et al. |
| 2003/0212954 A1 | 11/2003 | Patrudu |
| 2003/0220835 A1 | 11/2003 | Barnes, Jr. |
| 2003/0225485 A1 | 12/2003 | Fritz et al. |
| 2003/0229665 A1 | 12/2003 | Ryman |
| 2003/0236995 A1 | 12/2003 | Fretwell, Jr. |
| 2004/0003287 A1 | 1/2004 | Zissimopoulos et al. |
| 2004/0006591 A1 | 1/2004 | Matsui et al. |
| 2004/0015783 A1 | 1/2004 | Lennon et al. |
| 2004/0017825 A1 | 1/2004 | Stanwood et al. |
| 2004/0030627 A1 | 2/2004 | Sedukhin |
| 2004/0030740 A1 | 2/2004 | Stelting |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0093361 A1 | 5/2004 | Therrien et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0138858 A1 | 7/2004 | Carley |
| 2004/0151186 A1 | 8/2004 | Akama |
| 2004/0167967 A1 | 8/2004 | Bastian et al. |
| 2004/0177165 A1 | 9/2004 | Masputra et al. |
| 2004/0192312 A1 | 9/2004 | Li et al. |
| 2004/0199762 A1 | 10/2004 | Carlson et al. |
| 2004/0210663 A1 | 10/2004 | Phillips et al. |
| 2004/0210898 A1 | 10/2004 | Bergen et al. |
| 2004/0213156 A1 | 10/2004 | Smallwood et al. |
| 2004/0215665 A1 | 10/2004 | Edgar et al. |
| 2004/0236826 A1 | 11/2004 | Harville et al. |
| 2004/0255000 A1 | 12/2004 | Simionescu et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |

(56) References Cited

U.S. PATENT DOCUMENTS

| | | |
|---|---|---|
| 2005/0008017 A1 | 1/2005 | Datta et al. |
| 2005/0021703 A1 | 1/2005 | Cherry et al. |
| 2005/0021736 A1 | 1/2005 | Carusi et al. |
| 2005/0027841 A1 | 2/2005 | Rolfe |
| 2005/0027869 A1 | 2/2005 | Johnson |
| 2005/0044158 A1 | 2/2005 | Malik |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0071449 A1 | 3/2005 | Alex et al. |
| 2005/0078604 A1 | 4/2005 | Yim |
| 2005/0114508 A1 | 5/2005 | DeStefano |
| 2005/0117589 A1 | 6/2005 | Douady et al. |
| 2005/0122977 A1 | 6/2005 | Lieberman |
| 2005/0132068 A1 | 6/2005 | Rajamony |
| 2005/0138630 A1 | 6/2005 | Reynolds |
| 2005/0154837 A1 | 7/2005 | Keohane et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0187866 A1 | 8/2005 | Lee |
| 2005/0188220 A1 | 8/2005 | Nilsson et al. |
| 2005/0198234 A1 | 9/2005 | Leib et al. |
| 2005/0198310 A1 | 9/2005 | Kim et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0256806 A1 | 11/2005 | Tien et al. |
| 2005/0262238 A1 | 11/2005 | Reeves et al. |
| 2005/0273456 A1 | 12/2005 | Revanuru et al. |
| 2005/0288939 A1 | 12/2005 | Peled et al. |
| 2006/0031374 A1 | 2/2006 | Lu et al. |
| 2006/0031520 A1 | 2/2006 | Bedekar et al. |
| 2006/0031778 A1 | 2/2006 | Goodwin et al. |
| 2006/0036764 A1 | 2/2006 | Yokota et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0059267 A1 | 3/2006 | Cugi et al. |
| 2006/0075093 A1 | 4/2006 | Frattura |
| 2006/0077902 A1 | 4/2006 | Kannan et al. |
| 2006/0077986 A1 | 4/2006 | Rune |
| 2006/0083205 A1 | 4/2006 | Buddhikot et al. |
| 2006/0089985 A1 | 4/2006 | Poletto |
| 2006/0095573 A1 | 5/2006 | Carle et al. |
| 2006/0100752 A1 | 5/2006 | Kim et al. |
| 2006/0106802 A1 | 5/2006 | Giblin et al. |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0123210 A1 | 6/2006 | Pritchett et al. |
| 2006/0130133 A1 | 6/2006 | Andreev et al. |
| 2006/0133374 A1 | 6/2006 | Sekiguchi |
| 2006/0136584 A1 | 6/2006 | Decker |
| 2006/0140193 A1 | 6/2006 | Kakani et al. |
| 2006/0153201 A1 | 7/2006 | Hepper et al. |
| 2006/0156416 A1 | 7/2006 | Huotari et al. |
| 2006/0161577 A1 | 7/2006 | Kulkrni et al. |
| 2006/0168070 A1 | 7/2006 | Thompson et al. |
| 2006/0171365 A1 | 8/2006 | Borella |
| 2006/0179153 A1 | 8/2006 | Lee et al. |
| 2006/0182103 A1 | 8/2006 | Martini et al. |
| 2006/0184647 A1 | 8/2006 | Dixit et al. |
| 2006/0209669 A1 | 9/2006 | Nishio |
| 2006/0209853 A1 | 9/2006 | Hidaka et al. |
| 2006/0221077 A1 | 10/2006 | Wright et al. |
| 2006/0229861 A1 | 10/2006 | Tatsuoka et al. |
| 2006/0230148 A1 | 10/2006 | Forecast et al. |
| 2006/0233106 A1 | 10/2006 | Achlioptas et al. |
| 2006/0235998 A1 | 10/2006 | Stechler et al. |
| 2006/0242300 A1 | 10/2006 | Yumoto et al. |
| 2006/0259320 A1 | 11/2006 | LaSalle et al. |
| 2006/0268692 A1 | 11/2006 | Wright et al. |
| 2006/0268704 A1 | 11/2006 | Ansari et al. |
| 2006/0270341 A1 | 11/2006 | Kim et al. |
| 2006/0282442 A1 | 12/2006 | Lennon et al. |
| 2006/0291483 A1 | 12/2006 | Sela |
| 2007/0005807 A1 | 1/2007 | Wong |
| 2007/0006293 A1 | 1/2007 | Balakrishnan et al. |
| 2007/0016613 A1 | 1/2007 | Foresti et al. |
| 2007/0016662 A1 | 1/2007 | Desai et al. |
| 2007/0019636 A1 | 1/2007 | Lau et al. |
| 2007/0019658 A1 | 1/2007 | Park et al. |
| 2007/0038994 A1 | 2/2007 | Davis et al. |
| 2007/0297410 A1 | 2/2007 | Yoon et al. |
| 2007/0050843 A1 | 3/2007 | Manville et al. |
| 2007/0058670 A1 | 3/2007 | Konduru et al. |
| 2007/0064661 A1 | 3/2007 | Sood et al. |
| 2007/0067771 A1 | 3/2007 | Kulbak et al. |
| 2007/0083646 A1 | 4/2007 | Miller et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0112775 A1 | 5/2007 | Ackerman |
| 2007/0118879 A1 | 5/2007 | Yeun |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0130341 A1 | 6/2007 | Ma |
| 2007/0147246 A1 | 6/2007 | Hurley et al. |
| 2007/0162891 A1 | 7/2007 | Burner et al. |
| 2007/0168320 A1 | 7/2007 | Borthakur et al. |
| 2007/0168525 A1 | 7/2007 | DeLeon et al. |
| 2007/0174491 A1 | 7/2007 | Still et al. |
| 2007/0192543 A1 | 8/2007 | Naik et al. |
| 2007/0208839 A1 | 9/2007 | Voigt et al. |
| 2007/0220598 A1 | 9/2007 | Salowey et al. |
| 2007/0233809 A1 | 10/2007 | Brownell et al. |
| 2007/0233826 A1 | 10/2007 | Tindal et al. |
| 2007/0250560 A1 | 10/2007 | Wein et al. |
| 2007/0258451 A1 | 11/2007 | Bouat |
| 2007/0297551 A1 | 12/2007 | Choi |
| 2008/0004022 A1 | 1/2008 | Johannesson et al. |
| 2008/0008202 A1 | 1/2008 | Terrell et al. |
| 2008/0010372 A1 | 1/2008 | Khendouri et al. |
| 2008/0022059 A1 | 1/2008 | Zimmerer et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0072303 A1 | 3/2008 | Syed |
| 2008/0120370 A1 | 5/2008 | Chan et al. |
| 2008/0120592 A1 | 5/2008 | Tanguay et al. |
| 2008/0133518 A1 | 6/2008 | Kapoor et al. |
| 2008/0134311 A1 | 6/2008 | Medvinsky et al. |
| 2008/0141048 A1 | 6/2008 | Palmer |
| 2008/0141246 A1 | 6/2008 | Kuck et al. |
| 2008/0148340 A1 | 6/2008 | Powell et al. |
| 2008/0159145 A1 | 7/2008 | Muthukrishnan et al. |
| 2008/0162690 A1 | 7/2008 | Karagounis |
| 2008/0165801 A1 | 7/2008 | Sheppard |
| 2008/0178278 A1 | 7/2008 | Grinstein et al. |
| 2008/0201599 A1 | 8/2008 | Ferraiolo et al. |
| 2008/0205613 A1 | 8/2008 | Lopez |
| 2008/0208917 A1 | 8/2008 | Smoot et al. |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0239986 A1 | 10/2008 | Xu et al. |
| 2008/0253395 A1 | 10/2008 | Pandya |
| 2008/0256224 A1 | 10/2008 | Kaji et al. |
| 2008/0263401 A1 | 10/2008 | Stenzel |
| 2008/0270578 A1 | 10/2008 | Zhang et al. |
| 2008/0279200 A1 | 11/2008 | Shatzkamer et al. |
| 2008/0281908 A1 | 11/2008 | McCanne et al. |
| 2008/0281944 A1 | 11/2008 | Vorne et al. |
| 2008/0282354 A1 | 11/2008 | Wobber et al. |
| 2008/0288621 A1 | 11/2008 | Snell et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0028337 A1 | 1/2009 | Balabine et al. |
| 2009/0049230 A1 | 2/2009 | Pandya |
| 2009/0070617 A1 | 3/2009 | Arimilli et al. |

(56) References Cited

U.S. PATENT DOCUMENTS

| | | |
|---|---|---|
| 2009/0077619 A1 | 3/2009 | Boyce |
| 2009/0080440 A1 | 3/2009 | Balyan et al. |
| 2009/0089487 A1 | 4/2009 | Kwon et al. |
| 2009/0094311 A1 | 4/2009 | Awadallah et al. |
| 2009/0094610 A1 | 4/2009 | Sukirya |
| 2009/0097480 A1 | 4/2009 | Curtis et al. |
| 2009/0106413 A1 | 4/2009 | Salo et al. |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0125955 A1 | 5/2009 | DeLorme |
| 2009/0138314 A1 | 5/2009 | Bruce |
| 2009/0138749 A1 | 5/2009 | Moll et al. |
| 2009/0141891 A1 | 6/2009 | Boyen et al. |
| 2009/0144421 A1 | 6/2009 | Bunch |
| 2009/0161542 A1 | 6/2009 | Ho |
| 2009/0187915 A1 | 7/2009 | Chew et al. |
| 2009/0193513 A1 | 7/2009 | Agarwal et al. |
| 2009/0196282 A1 | 8/2009 | Fellman et al. |
| 2009/0217163 A1 | 8/2009 | Jaroker |
| 2009/0217386 A1 | 8/2009 | Schneider |
| 2009/0228956 A1 | 9/2009 | He et al. |
| 2009/0241176 A1 | 9/2009 | Beletski et al. |
| 2009/0265396 A1 | 10/2009 | Ram et al. |
| 2009/0265467 A1 | 10/2009 | Peles |
| 2009/0287935 A1 | 11/2009 | Aull et al. |
| 2009/0289828 A1 | 11/2009 | Hinchey |
| 2009/0292957 A1 | 11/2009 | Bower et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2009/0313044 A1 | 12/2009 | Hague et al. |
| 2009/0316708 A1 | 12/2009 | Yahyaoui et al. |
| 2009/0319600 A1 | 12/2009 | Sedan et al. |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0071048 A1 | 3/2010 | Novak et al. |
| 2010/0093318 A1 | 4/2010 | Zhu et al. |
| 2010/0115236 A1 | 5/2010 | Bataineh et al. |
| 2010/0131654 A1 | 5/2010 | Malakapalli et al. |
| 2010/0138530 A1 | 6/2010 | Brillhart |
| 2010/0146041 A1 | 6/2010 | Gentry |
| 2010/0150154 A1 | 6/2010 | Viger et al. |
| 2010/0154031 A1 | 6/2010 | Montemurro et al. |
| 2010/0165877 A1 | 7/2010 | Shukla et al. |
| 2010/0179984 A1 | 7/2010 | Sebastian |
| 2010/0188976 A1 | 7/2010 | Rahman et al. |
| 2010/0228814 A1 | 9/2010 | McKenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0251330 A1 | 9/2010 | Kroeselberg et al. |
| 2010/0274772 A1 | 10/2010 | Samuels |
| 2010/0279733 A1 | 11/2010 | Karsten et al. |
| 2010/0299451 A1 | 11/2010 | Yigang et al. |
| 2010/0306169 A1 | 12/2010 | Pishevar et al. |
| 2010/0318329 A1 | 12/2010 | Uraki |
| 2010/0322089 A1 | 12/2010 | R |
| 2010/0322250 A1 | 12/2010 | Shetty et al. |
| 2010/0325277 A1 | 12/2010 | Muthiah et al. |
| 2011/0022812 A1 | 1/2011 | van der Linden |
| 2011/0040889 A1 | 2/2011 | Garrett et al. |
| 2011/0047620 A1 | 2/2011 | Mahaffey et al. |
| 2011/0055386 A1 | 3/2011 | Middleton |
| 2011/0055921 A1 | 3/2011 | Narayanaswamy et al. |
| 2011/0066718 A1 | 3/2011 | Susai et al. |
| 2011/0066736 A1 | 3/2011 | Michell et al. |
| 2011/0072321 A1 | 3/2011 | Dhuse |
| 2011/0075667 A1 | 3/2011 | Li et al. |
| 2011/0078303 A1 | 3/2011 | Li et al. |
| 2011/0098087 A1 | 4/2011 | Tseng |
| 2011/0107077 A1 | 5/2011 | Henderson et al. |
| 2011/0113095 A1 | 5/2011 | Hatami-Hanza |
| 2011/0119374 A1 | 5/2011 | Ruhl et al. |
| 2011/0154073 A1 | 6/2011 | Wang |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0185082 A1 | 7/2011 | Thompson |
| 2011/0188415 A1 | 8/2011 | Graziano |
| 2011/0197059 A1 | 8/2011 | Klein et al. |
| 2011/0202676 A1 | 8/2011 | Craig et al. |
| 2011/0208875 A1 | 8/2011 | Hasson |
| 2011/0213911 A1 | 9/2011 | Eldus et al. |
| 2011/0246800 A1 | 10/2011 | Accpadi et al. |
| 2011/0258137 A1 | 10/2011 | Pasta |
| 2011/0264736 A1 | 10/2011 | Zuckerberg et al. |
| 2011/0273984 A1 | 11/2011 | Husu et al. |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0072586 A1 | 3/2012 | Kurahashi |
| 2012/0079055 A1 | 3/2012 | Robinson |
| 2012/0101952 A1 | 4/2012 | Raleigh et al. |
| 2012/0117028 A1 | 5/2012 | Gold et al. |
| 2012/0150805 A1 | 6/2012 | Pafumi et al. |
| 2012/0166430 A1 | 6/2012 | Bakalov |
| 2012/0191847 A1 | 7/2012 | Nas et al. |
| 2012/0195273 A1 | 8/2012 | Iwamura et al. |
| 2012/0224531 A1 | 9/2012 | Karuturi et al. |
| 2012/0254293 A1 | 10/2012 | Winter et al. |
| 2012/0257506 A1 | 10/2012 | Bazlamacci et al. |
| 2012/0258766 A1 | 10/2012 | Cho et al. |
| 2012/0311153 A1 | 12/2012 | Morgan |
| 2012/0313963 A1 | 12/2012 | Chen-Quee |
| 2012/0317266 A1 | 12/2012 | Abbott |
| 2013/0029726 A1 | 1/2013 | Berionne et al. |
| 2013/0031060 A1 | 1/2013 | Lowery et al. |
| 2013/0047027 A1 | 2/2013 | Hatasaki |
| 2013/0058229 A1 | 3/2013 | Casado et al. |
| 2013/0091002 A1 | 4/2013 | Christie et al. |
| 2013/0182713 A1 | 7/2013 | Giacomoni et al. |
| 2013/0189936 A1 | 7/2013 | Terrell et al. |
| 2013/0205361 A1 | 8/2013 | Narayanaswamy et al. |
| 2013/0238472 A1 | 9/2013 | Fan et al. |
| 2013/0336122 A1 | 12/2013 | Baruah et al. |
| 2013/0345896 A1 | 12/2013 | David |
| 2013/0347125 A1 | 12/2013 | Rezlan |
| 2014/0059678 A1 | 2/2014 | Parker |
| 2014/0071895 A1 | 3/2014 | Bane et al. |
| 2014/0095661 A1 | 4/2014 | Knowles et al. |
| 2014/0099945 A1 | 4/2014 | Singh et al. |
| 2014/0105069 A1 | 4/2014 | Potnuru |
| 2014/0136676 A1 | 5/2014 | Chow et al. |
| 2014/0019605 A1 | 6/2014 | Boberg et al. |
| 2014/0162705 A1 | 6/2014 | de Wit et al. |
| 2014/0171089 A1 | 6/2014 | Janakiraman et al. |
| 2014/0173127 A1 | 6/2014 | Samuels |
| 2014/0173612 A1 | 6/2014 | Haydock |
| 2014/0187199 A1 | 7/2014 | Yan et al. |
| 2014/0229595 A1 | 8/2014 | Burke et al. |
| 2014/0269484 A1 | 9/2014 | Dankberg et al. |
| 2014/0286316 A1 | 9/2014 | Park et al. |
| 2014/0317404 A1 | 10/2014 | Carlson et al. |
| 2014/0372581 A1 | 12/2014 | McLeish et al. |
| 2015/0049763 A1 | 2/2015 | Michels |

(56) References Cited

U.S. PATENT DOCUMENTS

| | | | |
|---|---|---|---|
| 2015/0058595 | A1 | 2/2015 | Gura et al. |
| 2016/0261478 | A1* | 9/2016 | Navasivasakthivelsamy ............. H04L 43/10 |

FOREIGN PATENT DOCUMENTS

| | | |
|---|---|---|
| EP | 0744850 | 11/1996 |
| EP | 1081918 | 3/2001 |
| JP | 06205006 | 7/1994 |
| JP | 8021924 | 3/1996 |
| JP | 2000/183935 | 6/2000 |
| JP | 2004/110345 | 4/2004 |
| WO | 9114326 | 9/1991 |
| WO | 9505712 | 2/1995 |
| WO | 9905829 | 2/1997 |
| WO | 9709805 | 3/1997 |
| WO | 9745800 | 12/1997 |
| WO | 9906913 | 2/1999 |
| WO | 9910858 | 3/1999 |
| WO | 9939373 | 8/1999 |
| WO | 9964967 | 12/1999 |
| WO | 0004422 | 1/2000 |
| WO | 0004458 | 1/2000 |
| WO | 0058870 | 10/2000 |
| WO | 2002/39696 | 5/2002 |
| WO | 03/039101 | 5/2003 |
| WO | 2006/091040 | 8/2006 |

OTHER PUBLICATIONS

F5 Networks, Inc., "F5 TMOS Operation Guide", Manual, Mar. 5, 2015, pp. 1-297.
F5 Networks, Inc., "BIG-IP® Application Security Manager™: Implementations", Manual, Jan. 31, 2014, pp. 1-396, Version 11.5.
F5 Networks, Inc., "BIG-IP® TMOS®: Implementations", Manual, Jan. 31, 2014, pp. 1-274, Version 11.5.
F5 Networks, Inc., "BIG-IP® Analytics: Implementations", Manual, Jan. 31, 2014, pp. 1-50, Version 11.5.
"A Process for Selective Routing of Servlet Content to Transcoding Modules," Research Disclosure 422124, Jun. 1999, pp. 889-890, IBM Corporation.
"Market Research & Releases, CMPP PoC documentation", last accessed Mar. 29, 2010 (http://mainsteet/sites/PD/Teams/ProdMgmt/MarketResearch/Universal).
"Market Research & Releases, Solstice Diameter Requirements", last accessed Mar. 29, 2010 (http://mainstreet/sites/PD/Teams/ProdMgmt/MarketResearch/Universal).
"Respond to server depending on TCP::client_port", DevCentral Forums iRules, pp. 1-6, last accessed Mar. 26, 2010 (http://devcentral.f5.com/Default/aspx?tabid=53&fommid=5&tpage=1&v).
"Servlet/Applet/HTML Authentication Process With Single Sign-On," Research Disclosure 429128, Jan. 2000, pp. 163-164, IBM Corporation.
"Traffic Surges; Surge Queue; Netscaler Defense," 2005, PowerPoint Presentation, slides 1-12, Citrix Systems, Inc.
"UDDI Overview", Sep. 6, 2000 pp. 1-21, uddi.org (http://www.uddi.org/).
"UDDI Technical White Paper", Sep. 6, 2000, pp. 1-12, uddi-org. (http://www.uddi.org/).
"UDDI Version 3.0.1", UDDI Spec Technical Committee Specification, Oct. 14, 2003, pp. 1-383, uddi.org. (http://www.uddi.org/).
Baer, T., et al., "The elements of Web services" ADTmag.com, Dec. 1, 2002, pp. 1-6 (http://www.adtmag.com).
Blue Coat, "Technology Primer: CIFS Protocol Optimization," Blue Coat Systems Inc., 2007, last accessed: Dec. 9, 2013, pp. 1-3, (http://www.bluecoat.com).
Chase J., et al., "Balance of Power: Energy Management for Server Clusters", In Proceedings of the 8$^{th}$ Workshop on Hot Topics in Operating Systems, 2001, pp. 1-6.
Crescendo Networks, "Application Layer Processing (ALP)", 2003-2009, pp. 168-186, Chapter 9, CN-5000E/5500E, Foxit Software Company.
Dean et al., "MapReduce: Simplified Data Processing on Large Clusters," pp. 1-13 (2004).
Diameter MBLB Support Phase 2: Generic Message Based Loan Balancing (BMGLG), last accessed Mar. 29, 2010, pp. 1-10, (http://peterpan.f5net.com/twiki/bin/view/TMOS/TMOSDiameterMBLB).
F5 Networks Inc., "3-DNS® Reference Guide, version 4.5", F5 Networks Inc., Sep. 2002, pp. 2-1-2-28, 3-1-3-12, 5-1-5-24, Seattle, Washington.
F5 Networks Inc., "BIG-IP® Reference Guide, version 4.5", F5 Networks Inc., Sep. 2002, pp. 11-1-11-32, Seattle, Washington.
F5 Networks Inc., "Case Information Log for 'Issues with BoNY upgrade to 4.3'", as early as Feb. 2008.
F5 Networks Inc., "Configuration Guide for Local Traffic Management," F5 Networks Inc., Jan. 2006, version 9.2.2, 406 pgs.
F5 Networks Inc., "Deploying the BIG-IP LTM for Diameter Traffic Management", F5® Deployment Guide, Publication date Sep. 2010, version 1.2, pp. 1-19.
F5 Networks Inc., "F5 Diameter RM", Powerpoint document, Jul. 16, 2009, pp. 1-7.
F5 Networks Inc., "F5 WANJet CIFS Acceleration", White Paper, F5 Networks Inc., Mar. 2006, pp. 1-5, Seattle, Washington.
F5 Networks Inc., "Routing Global Internet Users to the Appropriate Data Center and Applications Using F5's 3-DNS Controller", F5 Networks Inc., Aug. 2001, pp. 1-4, Seattle, Washington (http://www.f5.com/f5products/3dns/relatedMaterials/UsingF5.html).
F5 Networks Inc., "Using F5's-DNS Controller To Provide High Availability Between Two or More Data Centers", F5 Networks Inc., Aug. 2001, pp. 1-4, Seattle, Washington, (http://www.f5.com/f5roducts/3dns/relatedMaterials/3DNSRouting.html).
F5 Networks, Inc., BIG-IP ASM 11.5.0, Release Notes, Apr. 12, 2016, Version 11.5.0.
F5 Networks, Inc., "BIG-IP Local Traffic Manager: Implementations", Manual, pp. 1-270, Version 11.5.1 (Jul. 8, 2015).
F5 Networks, Inc., "BIG-IP TMOS: Implementations" Manual, Mar. 19, 2015, pp. 1-288, Version 11.5.1.
F5 Networks, Inc., "BIG-IP TMOS: IP Routing Administration", Manual, Version 11.5.1, 60 pages (Sep. 10, 2015).
F5 Networks, Inc., "BIG-IP® Analytics: Implementations", Manual, pp. 1-50, Version 11.5 (Aug. 25, 2015).
F5 Networks, Inc., "BIG-IP® Application Security Manager™: Implementations", Manual, pp. 1-396, Version 11.5 (Jan. 27, 2014).
F5 Networks, Inc., "BIG-IP® TMOS®: Concepts", Manual, pp. 1-148, Version 11.5 (May 1, 2014).
F5 Networks, Inc., "BIG-IP® TMOS®: Implementations", Manual, pp. 1-274, Version 11.5 (Sep. 2, 2014).
F5 Networks, Inc., "BIP-IP Controller with Exclusive OneConnect Content Switching Feature Provides a Breakthrough System for Maximizing Server and Network Performance," Press Release, May 8, 2001, 2 ages, Las Vegas, Nevada.
F5 Networks, Inc., "F5 TMOS Operations Guide", Manual, 279 pages (Nov. 2015).
F5 Networks, Inc., "BIG-IP Local Traffic Manager & BIG-IP DNS Operations Guide," 136 pages (Nov. 2015).
Fajardo V., "Open Diameter Software Architecture," Jun. 25, 2004, pp. 1-6, Version 1.0.7.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176.
Floyd et al., "Random Early Detection Gateways for Congestion Avoidance," Aug. 1993, pp. 1-22, IEEE/ACM Transactions on Networking, California.
Gupta et al., "Algorithms for Packet Classification", Computer Systems Laboratory, Stanford University, CA, Mar./Apr. 2001, pp. 1-29.
Heinz G., "Priorities in Stream Transmission Control Protocol (SCTP) Multistreaming", Thesis submitted to the Faculty of the University of Delaware, Spring 2003, pp. 1-35.

(56) References Cited

OTHER PUBLICATIONS

Hochmuth, Phil, "F5, CacheFlow pump up content-delivery lines," Network World Fusion, May 4, 2001, 1 page, Las Vegas, Nevada.
Ilvesjmaki M., "On the capabilities of application level traffic measurements to differentiate and classify internet traffic", Presented in SPIE's International Symposium ITcom, Aug. 19-21, 2001, pp. 1-11, Denver, Colorado.
International Search Report and Opinion, PCT/US2012/022996, dated May 30, 2012.
International Search Report and Written Opinion, for International Patent Application No. PCT/US2011/058469, dated May 30, 2012.
International Search Report for International Patent Application No. PCT/US2013/026615 (dated Jul. 4, 2013).
Internet protocol, "Darpa Internet Program Protocol Specification" (RFC:791), Information Sciences Institute, University of Southern California, Sep. 1981, pp. 1-49.
Kawamoto D., "Amazon files for Web services patent", CNET News.com, Jul. 28, 2005, pp. 1-2 (http://news.com).
LaMonica M., "Infravio spiffs up Web services registry idea", CNET News.com, May 11, 2004, pp. 1-2 (http://www.news.com).
Macvittie, Lori, "Message-Based Load Balancing," Technical Brief, Jan. 2010, pp. 1-9, F5 Networks, Inc.
Macvittie, Lori, "Message-Based Load Balancing: Using F5 solutions to address the challenges of scaling Diameter, Radius, and message-oriented protocols", F5 Technical Brief, 2005, pp. 1-9, F5 Networks Inc., Seattle, Washington.
MapReduce Links, retrieved at http://www.dbms2.com/2008/08/25/mapreduce-links/ (Aug. 25, 2008).
Modiano E., "Scheduling Algorithms for Message Transmission over a Satellite Broadcast System," MIT Lincoln Laboratory Advanced Network Group, Nov. 1997, pp. 1-7.
Nichols K., et al., "Definition of the Differentiated Services Field (DS Field) in the IPv4 and the IPv6 Headers", (RFC:2474) Network Working Group, Dec. 1998 pp. 1-19 (http://www.ietf.org/rfc2474.txt).
Ott D., et al. "A Mechanism for TCP-Friendly Transport-level Protocol Coordination", USENIX Annual Technical Conference, Jun. 10, 2002, University of North Carolina at Chapel Hill, pp. 1-12.
Padmanabhan V., et al., "Using Predictive Prefetching to Improve World Wide Web Latency", SIGCOM, Jul. 1, 1996, pp. 1-15.
Rosen E., et al., "MPLS Label Stack Encoding", (RFC:3032) Network Working Group, Jan. 2001, pp. 1-22 (http://www.ietf.org/rfc/rfc3032.txt).
Schilit B., "Bootstrapping Location-Enhanced Web Services", University of Washington, Dec. 4, 2003 (http://www.cs.washington.edu/news/colloq.info.html).
Seeley R., "Can Infravio technology revive UDDI?", ADTmag.com, Oct. 22, 2003 (http://www.adtmag.com).
Shohoud, Y., Building XML Web Services with VB .net and VB 6:, Addison Wesley, Sep. 2002, pp. 1-14.
Sleeper B., "The Evolution of UDDI", UDDI.org White Paper, The Stencil Group, Inc., Jul. 19, 2002, pp. 1-15, San Francisco, California.
Sleeper, B., "Why UDDI Will Succeed, Quietly: Two Factors Push Web Services Forward", The Stencil Group, Inc., Apr. 2001, pp. 1-7, San Francisco, California.
Sommers F., "Whats New in UDDI 3.0—Part 1", Web Services Papers, Jan. 27, 2003, pp. 1-4 (http://www.webservices.org/index/php/article/articleprint/871/-1/24/).
Sommers F., "Whats New in UDDI 3.0—Part 2", Web Services Papers, Mar. 2, 2003, pp. 1-8 (http://www.web.archive.org/web/20040320131006/).
Sommers F., "Whats New in UDDI 3.0—Part 3", Web Services Papers, Sep. 2, 2003, pp. 1-4 (http://www.webservices.org/index.php/article/articleprint/894/-1/24/).
U.S. Appl. No. 13/771,538 to Michels et al., filed Feb. 20, 2013.
Wang, B., "Priority and realtime data transfer over the best-effort Internet", Dissertation Abstract, ScholarWorks@UMASS, Sep. 2005, pp. I-xiv and pp. 1-9.
Wikipedia, "Diameter (protocol)", pp. 1-11, last accessed Oct. 27, 2010 (http://en.wikipedia.og/wiki.Diameter_(protocol)).
Woo T.Y.C., "A Modular Approach to Packet Classification: Algorithms and Results", Nineteenth Annual Conference of the IEEE Computer and Communications Societies 3(3): 1213-22, Mar. 26-30, 2000, abstract only (http://ieeexploe.ieee.og/xpl/freeabs_all.isp?arnumber-832499).

* cited by examiner

METHODS FOR ANALYZING AND LOAD BALANCING BASED ON SERVER HEALTH AND DEVICES THEREOF

This application claims the benefit of U.S. Provisional Patent Application Ser. No. 62/156,973, filed on May 5, 2015, which is hereby incorporated by reference in its entirety.

FIELD

This technology generally relates to computer networks and, more particular, to methods and devices for analyzing server health.

BACKGROUND

Server health is often analyzed based on thresholds established by network administrators corresponding to latency observed in network traffic. For example, network traffic exchanged between server devices and traffic management computing devices that are disposed between client devices and these server devices in a network. However, latency is not a robust or effective metric with respect to server health.

In particular, current methods for analyzing server health based on latency do not facilitate effective load balancing decisions or early recognition of impending server saturation or other server health problems. Additionally, the thresholds used by current server health analysis methods are static and may not accurately identify server health problems, particularly over an extended period of time.

SUMMARY

A method for analyzing server health includes monitoring, by a health analysis apparatus, network traffic exchanged with a plurality of server devices in a server pool to obtain signal data regarding a plurality of signals associated with the network traffic. A determination is made, by the health analysis apparatus, when there is a sever health anomaly for one or more of the server devices based on an application of a server health prediction model to the signal data. The server health prediction model includes a plurality of predictive health targets each based at least in part on historical signal data for one or more of the signals and having an associated threshold value. A mitigation action is initiated, by the health analysis apparatus, when the determining indicates there is a sever health anomaly for one or more of the server devices.

A health analysis apparatus includes memory comprising programmed instructions stored in the memory and one or more processors configured to be capable of executing the programmed instructions stored in the memory to monitor network traffic exchanged with a plurality of server devices in a server pool to obtain signal data regarding a plurality of signals associated with the network traffic. A determination is made when there is a sever health anomaly for one or more of the server devices based on an application of a server health prediction model to the signal data. The server health prediction model includes a plurality of predictive health targets each based at least in part on historical signal data for one or more of the signals and having an associated threshold value. A mitigation action is initiated when the determining indicates there is a sever health anomaly for one or more of the server devices.

A non-transitory computer readable medium having stored thereon instructions for analyzing server health traffic includes executable code which when executed by one or more processors, causes the one or more processors to perform steps including monitoring network traffic exchanged with a plurality of server devices in a server pool to obtain signal data regarding a plurality of signals associated with the network traffic. A determination is made when there is a sever health anomaly for one or more of the server devices based on an application of a server health prediction model to the signal data. The server health prediction model includes a plurality of predictive health targets each based at least in part on historical signal data for one or more of the signals and having an associated threshold value. A mitigation action is initiated when the determining indicates there is a sever health anomaly for one or more of the server devices.

This technology has a number of associated advantages including providing methods, non-transitory computer readable media, and health analysis apparatuses that more effectively analyze server health. This technology facilitates monitoring of server health based on observed network traffic signal data and the application of dynamically generated models to the signal data. The models generated by this technology consider historical server health anomalies and associated signal data and are more effective to predict future server health anomalies. Additionally, this technology advantageously leverages a more effective server health analysis to make load balancing decisions, thereby improving resource utilization, round trip times to client devices, and the associated end user experience.

DETAILED DESCRIPTION

Figure 1:
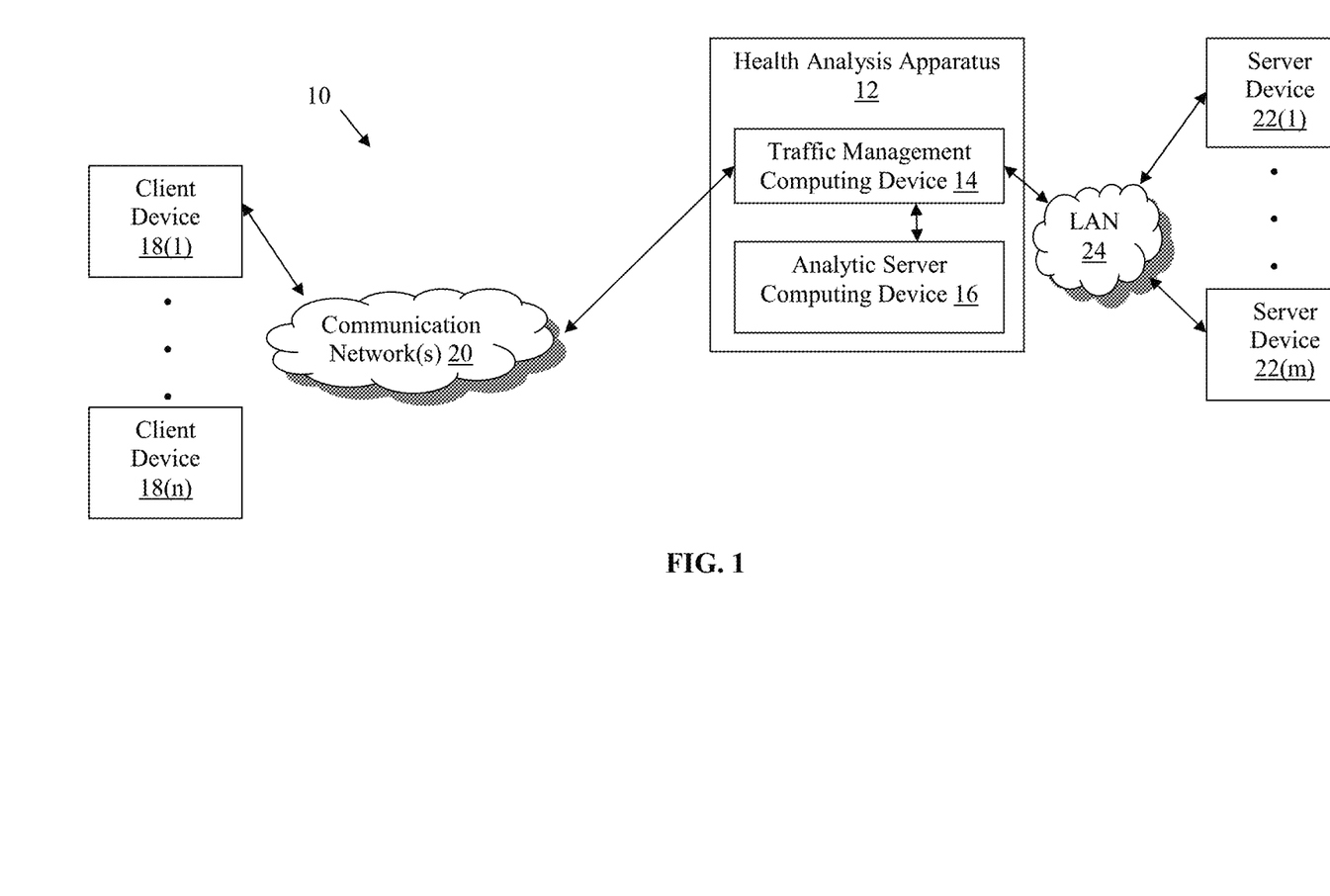
FIG. 1 is a block diagram of a network environment with an exemplary health analysis apparatus with a traffic management computing device and an analytic server computing device.

Referring to FIG. 1, a system diagram of an exemplary network environment 10 including an exemplary health analysis apparatus 12 with a traffic management computing device 14 and an analytic server computing device 16 is illustrated. In this example, the traffic management computing device 14 is coupled to client devices 18(1)-18(n) through communication network(s) 20, server devices 22(1)-22(m) through a local area network (LAN) 24, and the analytic server computing device 16 through a direct connection, although the traffic management computing device 12, client devices 18(1)-18(n), server devices 22(1)-22(m), and analytic server computing device 16 may be coupled together via other topologies. The network environment 10 may also include other network devices, such as one or more routers and/or switches, for example, which are well known in the art and thus will not be described herein. This technology provides a number of advantages including methods, non-transitory computer readable media, and health analysis apparatuses that facilitate more effective dynamic health monitoring of server devices and load balancing of network traffic to the server devices.

Figure 2:
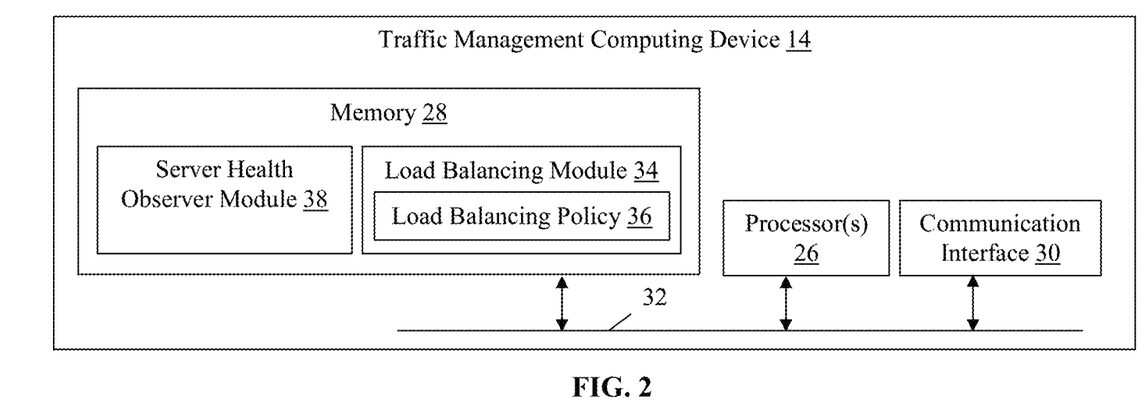
FIG. 2 is a block diagram of the exemplary traffic management computing device shown in FIG. 1.

Referring to FIGS. 1-2, the traffic management computing device 14 may perform any number of functions in addition to analyzing server health including detecting and sending signal data to the analytic server computing device 16, and accelerating and optimizing network traffic communicated between the server devices 22(1)-22(m) and client devices 18(1)-18(n) in order to improve the user experience. The traffic management computing device 14 can also perform other functions on the network traffic, such as load balancing the network traffic to the server devices 22(1)-22(m) and/or implementing firewalls or other security measures on behalf of web applications executing on the server devices, for example. The traffic management computing device 14 includes processor(s) 26, a memory 28, and a communication interface 30, which are coupled together by a bus 32 or other communication link, although the traffic management computing device 14 may include other types and numbers of elements in other configurations.

The processor(s) 26 of the traffic management computing device 14 may execute programmed instructions for any number of the functions identified above and/or described herein for dynamic health monitoring of server devices 22(1)-22(m) and load balancing network traffic among the server devices 22(1)-22(m) and, optionally, managing network traffic and/or optimizing service of content requests, for example. The processor(s) 26 of the traffic management computing device 14 may include one or more central processing units and/or general purpose processors with one or more processing cores, for example, although other types of processor(s) can also be used.

The memory 28 of the traffic management computing device 14 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), flash, hard disk drives, solid state drives, or other computer readable medium which is read from and written to by a magnetic, optical, or other reading and writing system that is coupled to the processor(s) 26, can be used for the memory 28.

Figure 4:
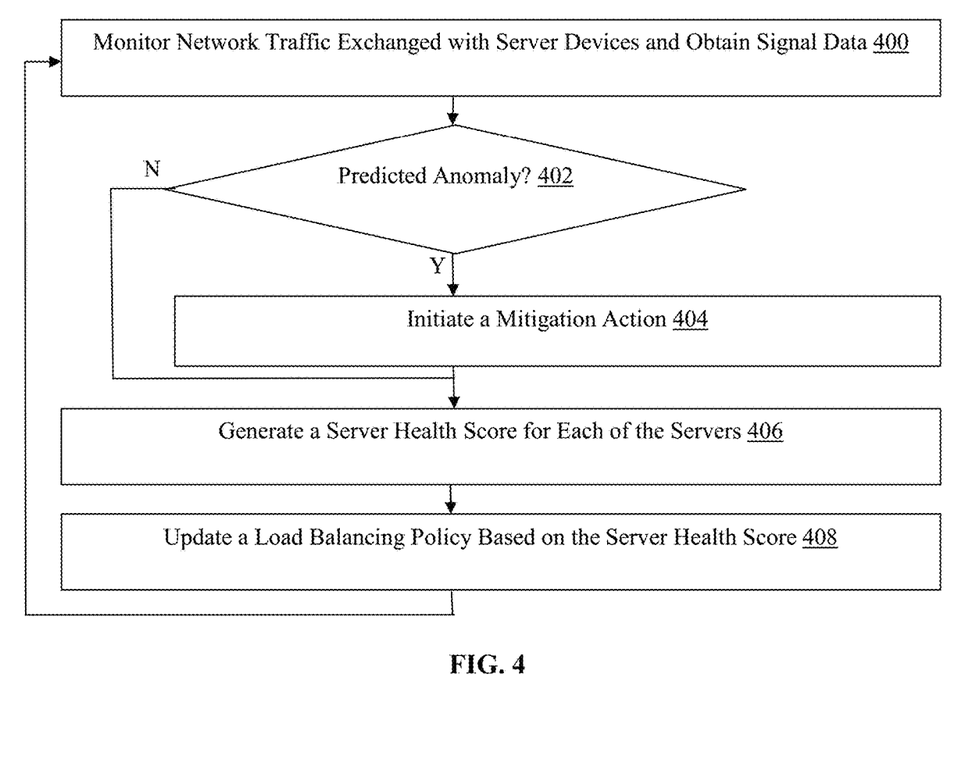
FIG. 4 is a flowchart of an exemplary method for analyzing server health.

Accordingly, the memory 28 of the traffic management computing device 14 can store one or more applications that can include computer executable instructions that, when executed by the traffic management computing device 14, cause the traffic management computing device 14 to perform actions, such as to transmit, receive, or otherwise process messages, for example, and to perform other actions described and illustrated below with reference to FIGS. 4-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the traffic management computing device 14 itself, may be located in virtual server(s) running in a cloud-based computing environment rather than being tied to one or more specific physical network computing devices. Also, the application(s) may be running in one or more virtual machines (VMs) executing on the traffic management computing device 14. Additionally, in one or more embodiments of this technology, virtual machine(s) running on the traffic management computing device 14 may be managed or supervised by a hypervisor.

In this particular example, the memory 28 further includes a load balancing module 34 that includes a load balancing policy 36 and a server health observer module 38. The load balancing module 34 is configured to implement the load balancing policy 36 to distribute network traffic among the server devices 22(1)-22(m) based on a server health score for each of the server devices 22(1)-22(m), as described and illustrated in more detail later. The server health observer module 38 is configured to monitor server-side signals to obtain data and apply models in order to determine the health of the server devices 22(1)-22(m) or whether one or more of the server devices 22(1)-22(m) is experiencing an anomaly representative of a health issue, also as described and illustrated in more detail later.

The communication interface 30 of the traffic management computing device 14 operatively couples and communicates between the traffic management computing device 14, client devices 18(1)-18(n), server devices 22(1)-22(m), and analytic server computing device 16, which are all coupled together by the LAN 24, communication network(s) 20 and direct connection(s), although other types and numbers of communication networks or systems with other types and numbers of connections and configurations to other devices and elements. By way of example only, the LAN and communication network(s) 20 can use TCP/IP over Ethernet and industry-standard protocols, including NFS, CIFS, SOAP, XML, LDAP, and SNMP, although other types and numbers of communication networks, can be used.

Figure 3:
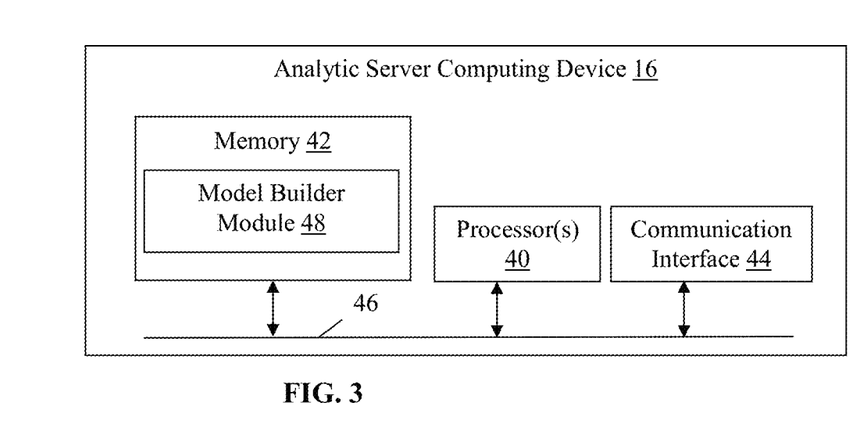
FIG. 3 is a block diagram of the exemplary analytic server computing device shown in FIG. 2.

Referring to FIGS. 1-3, the analytic server computing device 16 is configured to process signal data received from the traffic management computing device 14 and generate server health models that facilitate subsequent network traffic analysis by the traffic management computing device 14. While the analytic server computing device 16 is illustrated in this particular example as a separate device that allows significant processing related to model generation and machine learning to be performed separate from the traffic management computing device 14, in other examples, the functionality provided by the analytic server computing device 16 can be performed by analytic modules included in the memory 28 of the traffic management computing device 14, and other configurations can also be used.

In yet other examples, the analytic server computing device 16 can be located in a local network or outside of a local network and accessible via a cloud architecture, for example. In this particular example, the analytic server computing device 16 includes processor(s) 40, a memory 42, and a communication interface 44, which are coupled together by a bus 46 or other communication link, although the analytic server computing device 16 may include other types and numbers of elements in other configurations.

The processor(s) 40 of the analytic server computing device 16 may execute programmed instructions for any number of the functions identified above and/or described herein for generating server health models that facilitate the identification of anomalous network traffic by the traffic management computing device 14. The processor(s) 40 of the analytic server computing device 16 may include one or more central processing units and/or general purpose processors with one or more processing cores, for example.

The memory 42 of the analytic server computing device 16 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), flash memory, hard disk drives, solid state drives, or other computer readable medium which is read from and written to by a magnetic, optical, or other reading and writing system that is coupled to the processor(s) 40, can be used for the memory 42.

Accordingly, the memory 42 of the analytic server computing device 16 can store one or more applications that can include computer executable instructions that, when executed by the analytic server computing device 16, cause the analytic server computing device 16 to perform actions, such as to transmit, receive, or otherwise process messages, for example, and to perform other actions described and illustrated below with reference to FIGS. 4-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the analytic server computing device 20 itself, may be located in virtual server(s) running in a cloud-based computing environment rather than being tied to one or more specific physical network computing devices. Also, the application(s) may be running in one or more virtual machines (VMs) executing on the analytic server computing device 16. Additionally, in one or more embodiments of this technology, virtual machine(s) running on the analytic server computing device 16 may be managed or supervised by a hypervisor.

In this particular example, the memory 42 of the analytic server computing device 16 further includes a model builder module 48. The model builder module 48 in this example is configured to dynamically generate models that can be applied by the traffic management computing device 14 to identify anomalous network traffic impacting the health of one or more of the server devices 22(1)-22(m), although the model builder module 48 can be configured to execute other types and/or numbers of other health monitoring functions and/or other operations. The models can include thresholds for any number of signals and an estimated number of pending requests that, when one or more are exceeded, indicate that an anomaly exists, as described and illustrated in more detail later.

The communication interface 44 of the analytic server computing device 16 operatively couples and communicates with the traffic management computing device 14, which is coupled to the analytic server computing devices by a direct connection or LAN (not shown), although other types and numbers of communication networks or systems with other types and numbers of connections and configurations to other devices and elements can also be used.

Each of the server devices 22(1)-22(m) in this example includes one or more processors, a memory, and a communication interface, which are coupled together by a bus or other communication link, although other numbers and types of network devices could be used. The server devices 22(1)-22(m) in this example process requests received from the client devices 18(1)-18(n) via the communication network(s) 20 according to the HTTP-based application RFC protocol, for example. Various applications may be operating on the server devices 22(1)-22(m) and transmitting data (e.g., files or Web pages) to the client devices 18(1)-18(n) via the traffic management computing device 14 in response to requests from the client devices 18(1)-18(n). The server devices 22(1)-22(m) may be hardware or software or may represent a system with multiple servers in a pool, which may include internal or external networks.

Although the server devices 22(1)-22(m) are illustrated as single devices, one or more actions of each of the server devices 22(1)-22(m) may be distributed across one or more distinct network computing devices that together comprise one or more of the server devices 22(1)-22(m). Moreover, the server devices 22(1)-22(m) are not limited to a particular configuration. Thus, the server devices 22(1)-22(m) may contain a plurality of network computing devices that operate using a master/slave approach, whereby one of the network computing devices of the server devices 22(1)-22(m) operate to manage and/or otherwise coordinate operations of the other network computing devices. The server devices 22(1)-22(m) may operate as a plurality of network computing devices within a cluster architecture, a peer-to-peer architecture, virtual machines, or within a cloud architecture, for example.

Thus, the technology disclosed herein is not to be construed as being limited to a single environment and other configurations and architectures are also envisaged. For example, one or more of the server devices 22(1)-22(m) can operate within the traffic management computing devices 14 itself, rather than as a stand-alone server device. In this example, the one or more of the server devices 22(1)-22(m) operate within the memory 28 of the traffic management computing devices 14.

The client devices 18(1)-18(n) in this example include any type of computing device that can generate, receive, and process network traffic, such as mobile computing devices, desktop computing devices, laptop computing devices, tablet computing devices, virtual machines (including cloud-based computers), or the like. Each of the client devices 18(1)-18(n) in this example includes a processor, a memory, and a communication interface, which are coupled together by a bus or other communication link, although other numbers and types of network devices could be used.

The client devices 18(1)-18(n) may run interface applications, such as standard web browsers or standalone client applications, that may provide an interface to make requests for, and receive content stored on, one or more of the server devices 22(1)-22(m) via the communication network(s) 20. The client devices 18(1)-18(n) may further include a display device, such as a display screen or touchscreen, and/or an input device, such as a keyboard for example.

Although the exemplary network environment with the traffic management computing device 14, client devices 18(1)-18(n), server devices 22(1)-22(m), analytic server computing device 16, LAN 24, and communication network(s) 20 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 10, such as the traffic management computing device 14, client devices 18(1)-18(n), server devices 22(1)-22(m), or analytic server computing device 16, for example, may be configured to operate as virtual instances on the same physical machine. In other words, one or more of the traffic management computing device 14, client devices

18(1)-18(n), server devices 22(1)-22(m), or analytic server computing device 16 may operate on the same physical device rather than as separate devices communicating through communication network(s). Additionally, there may be more or fewer traffic management computing device, client devices, server devices, or analytic server computing devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as non-transitory computer readable media having instructions stored thereon for one or more aspects of the present technology as described and illustrated by way of the examples herein, as described herein, which when executed by a processor, cause the processor to carry out the steps necessary to implement the methods of the examples, as described and illustrated herein.

Exemplary methods for analyzing server health will now be described with reference to FIGS. 1-5. Referring more specifically to FIG. 3, a method for monitoring the health of the server devices 22(1)-22(m) is illustrated. In step 400 in this example, the health analysis apparatus 12 monitors network traffic exchanged with the server devices 22(1)-22(m) to obtain raw health signal data.

Optionally, the traffic management computing device 14 of the health analysis apparatus 12 can obtain the signal data periodically (e.g., every second) over a specified period of time, and can combine the signal data into a snapshot, which is sent to the model builder module 48 of the analytic server computing device 14. The signal data can include transactions per second, requests per second, request jitter, response jitter, drops per second, pending transactions per second, concurrent connections per second, bytes in per second, bytes out per second, upload time, download time, idle time, inter-packet time, mean and/or median latency over a specified time period, server errors per second, or redirected requests per second, for example, although other signals can also be used.

Figure 5:
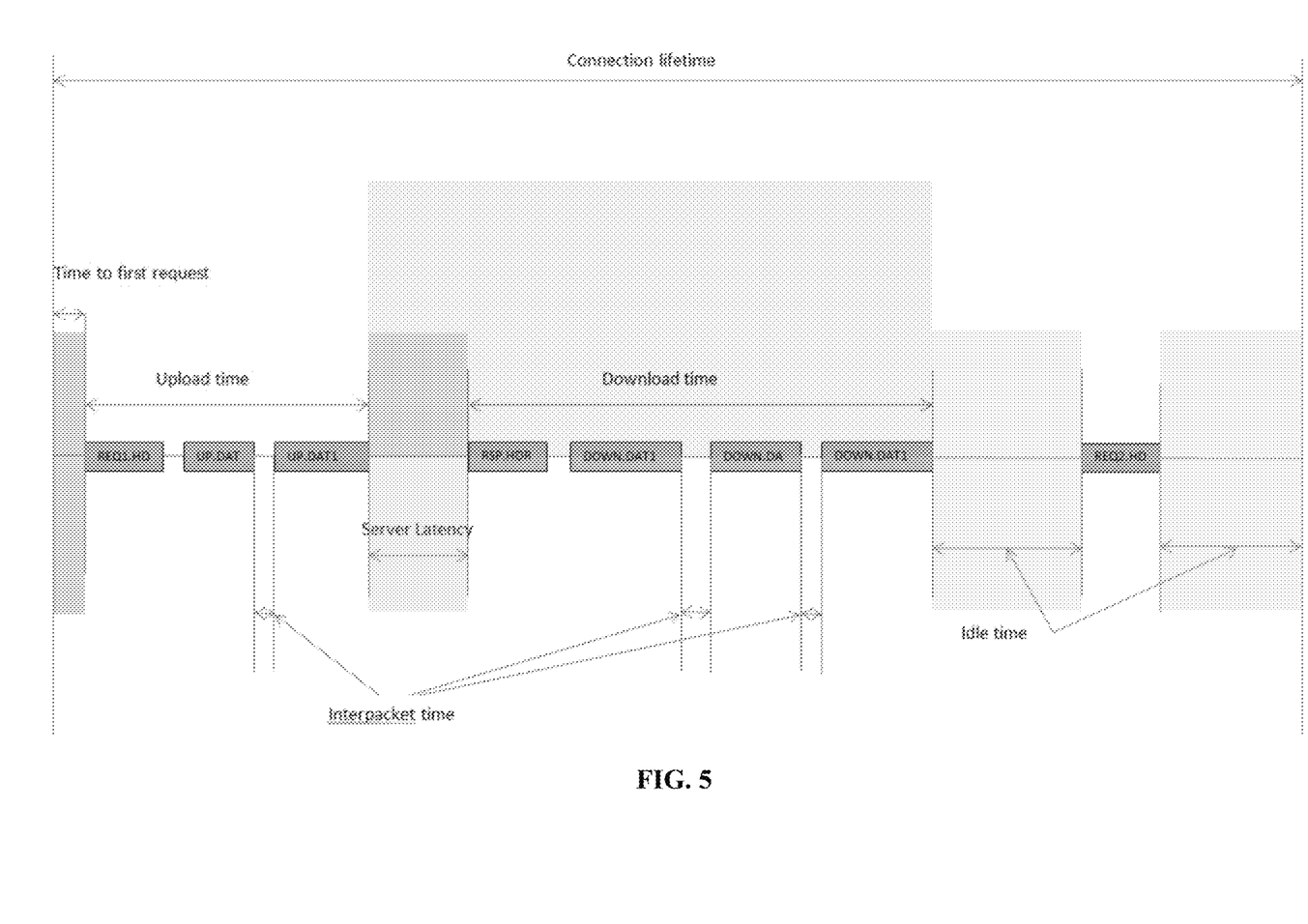
FIG. 5 is an exemplary connection lifetime timing diagram.

Referring more specifically to FIG. 5, an exemplary connection lifetime timing diagram is illustrated. In this example, a request is received by the traffic management computing device 14 followed by an upload time. Subsequent to the upload, the connection experiences a latency associated with one of the server devices 22(1)-22(m) to which the request is directed. In response to the request, the one of the server devices 22(1)-22(m) provides requested data during a download time. Subsequent to the download time, the traffic management computing device 14 is idle during an idle time before and after a subsequent request is received. In this example, one or more of the upload time, server latency, download time, inter-packet time, or idle time can be recorded as part of the signal data.

Referring back to FIG. 4, in step 402, the health analysis apparatus 12 determines whether there is a predicted anomaly in the network traffic monitored in step 400. In order to determine whether there is a predicted anomaly, the traffic management computing device 12 can apply a server health prediction model received from the model builder module 48 of the analytic server computing device 16 to the signal data obtained for each of the server devices 22(1)-22(m) in step 400. The server health prediction model can be dynamically modified and can result from a machine learning process applied to historical predicted and actual anomalies and associated historical signal data.

In this particular example, the server health prediction model can include a plurality of predictive health targets, such as expressions or values that have a benign range and for which associated boundaries or thresholds have been determined over time based on server health feedback. The predictive health targets can be saturation expressions, pending transaction (or pending request) expressions, and/or ratios that have components corresponding to the signals for which signal data is obtained in step 400 (e.g., pending transactions to concurrent connections or request jitter for the traffic management computing device 14 to request jitter for one or more of the server devices 22(1)-22(m)), although other types of expressions can also be used for the predictive health targets. Additionally, the predictive health targets can include expected latency, expected drops per second, expected server errors per second, or redirected requests per second, for example, and values for other signals can also be used for the predictive health targets.

The predictive health targets are generated using both current value(s) of the predictive health target component(s) in the signal data (e.g., current number of pending requests) and also historical signal data for the component(s) in the predictive health targets that is obtained in one or more other time windows. Accordingly, in this example, predictive health target and signal data values during time interval of W seconds (in which there are W values for every predictive health target and every signal data value (assuming signal data is collected every second)) and predictive health target values and signal data values during the following W seconds (i.e., in time t+w) are used in one or more machine learning algorithms to build the server health prediction model(s) that include the predictive health targets analyzed in step 402.

Accordingly, the health analysis apparatus 12 can predict a server health anomaly in step 402 when a specified number or one or more specified ones of the threshold values for one or more of the predictive health targets in the server health prediction model have been exceeded, for example. In other examples, other methods of determining whether there is a predicted server health anomaly using the signal data and predictive health targets also can be used. If the health analysis apparatus 12 determines there is a server health anomaly, then the Yes branch is taken to step 404.

In step 404, the health analysis apparatus 12 initiates a mitigation action. The mitigation action can include blocking network traffic having certain characteristics, intentionally dropping packets from certain of the client devices 18(1)-18(n), presenting certain client devices with challenges before proceeding to accept network traffic in order to confirm whether the client devices 18(1)-18(n) are malicious bots, redirecting network traffic to one or more relatively healthy of the server devices 22(1)-22(m), or any other type of mitigation action intended to defend the one or more of the server devices. Accordingly, the mitigation action can be initiated by the traffic management computing device 14, for example. Subsequent to initiating the mitigation action, or if the health analysis apparatus 12 determines in step 402 that there is not a predicted anomaly in the network traffic and the No branch is taken, then the health analysis apparatus 12 proceeds to step 406.

In step 406, the health analysis apparatus 12 generates a server health score for each of the server devices 22(1)-22(m) based on an application of the server health prediction model. The server health score corresponds with an estimated saturation level of each of the server devices 22(1)-22(m) and can be generated by the model builder module 48 of the analytic server computing device 16, for example. The server devices 22(1)-22(m) are considered saturated when additional requests or connections cannot be serviced. Accordingly the server health score represents an estimated saturation level or how close one of the server devices 22(1)-22(m) is to saturation.

In this particular example, the server health score can be generated based on the value of one or more of the expressions or values corresponding to one or more of the predictive health targets as compared to the threshold for the one or more expressions or values corresponding to the one or more of the predictive health targets, although server health scores can be generated based on other values and data. The predictive health target thresholds are optionally dynamic and determined over time based on historical values of the various signals when anomalies or health issues have occurred with each of the server devices 22(1)-22(m).

In step 408, the health analysis apparatus 12 updates the load balancing policy 36 based on the generated server health scores. Optionally, the load balancing module 34 of the traffic management computing device 14 can store one or more load balancing policies (e.g., load balancing policy 36) that can be applied to received network traffic in order to identify ones of the server devices 22(1)-22(m) to which the network traffic should be sent in order to provide a relatively balanced distribution of the network traffic across the server pool.

By using the server health scores as the load balancing criterion, ones of the server devices 22(1)-22(m) that are relatively healthy can process more of the network traffic received by the traffic management computing device 14, thereby resulting in more efficient responses to requests sent by the client devices 18(1)-18(n) and an associated improved user experience. Optionally, the server health scores can also be used to dynamically spawn an additional server device to join the pool and share the load of the server devices 22(1)-22(m) or to shift the load to a relatively healthy one or more other of the server devices 22(1)-22(m), for example.

Subsequent to updating the load balancing policy, the health analysis apparatus 12 proceeds back to step 400 and continues monitoring network traffic exchanged with the server devices 22(1)-22(m) to obtain signal data. In some examples, a plurality of iterations of steps 400-408 illustrated in FIG. 4 are performed by the health analysis apparatus 12, so that the predictive health targets of the server health prediction model become relatively reliable, prior to mitigation actions being taken in step 404 and/or the load balancing policy 36 being updated in step 408. During the iterative process, and based on the machine learning performed by the analytic server computing device 16, the predictive health targets of the server health prediction model can be validated and invalidated based on actual health target indicators representative of actual health issues or anomalies with one or more of the server devices 22(1)-22(m).

Accordingly, with this technology, server health issues can advantageously be identified and mitigated earlier and before service significantly deteriorates. Additionally, threshold values for various signals can be learned and dynamically changed over time based on historical signal data and anomalies to provide a relatively effective model for predicting future anomalies with respect to server health. Further, network traffic can be more effectively load balanced to servers in a server pool based on the health of the server.

Having thus described the basic concept of the disclosed technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosed technology. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for analyzing server health, comprising:
monitoring network traffic exchanged with a plurality of servers to obtain signal data regarding a plurality of signals associated with the network traffic;
applying a server health prediction model to the signal data to generate a server health score for each of the servers, the server health prediction model comprising a plurality of predictive health targets each based at least in part on historical signal data and having an associated threshold value, the historical signal data obtained based on an analysis of monitored network traffic exchanged between one or more of a plurality of clients and one or more of the servers; and
updating a stored load balancing policy based on the generated server health score for each of the servers to modify a distribution across the servers of network traffic received from the clients.

2. The method of claim 1, wherein the server health score for each of the servers, which is generated based the application of the server health prediction model to the signal data obtained based on the monitoring of network traffic exchanged with the servers, comprises an estimated saturation level of each of the servers.

3. The method of claim 1, further comprising:
determining when there is a predicted server health anomaly based on the application of the server health prediction model to the signal data; and
initiating a mitigation action when the determination indicates that there is a predicted server health anomaly.

4. The method of claim 1, wherein the signal data comprises one or more of transactions per second, requests per second, request jitter, response jitter, drops per second, pending transactions per second, bytes in per second, bytes out per second, upload time, download time, idle time, inter-packet time, or response codes.

5. The method of claim 1, further comprising determining when a specified number or one or more specified ones of the threshold values has been exceeded.

6. A non-transitory computer readable medium having stored thereon instructions for analyzing server health comprising executable code that, when executed by one or more processors, causes the processors to:

monitor network traffic exchanged with a plurality of servers to obtain signal data regarding a plurality of signals associated with the network traffic;

apply a server health prediction model to the signal data to generate a server health score for each of the servers, the server health prediction model comprising a plurality of predictive health targets each based at least in part on historical signal data and having an associated threshold value, the historical signal data obtained based on an analysis of monitored network traffic exchanged between one or more of a plurality of clients and one or more of the servers; and update a stored load balancing policy based on the generated server health score for each of the servers to modify a distribution across the servers of network traffic received from the clients.

7. The non-transitory computer readable medium of claim 6, wherein the server health score for each of the servers, which is generated based the application of the server health prediction model to the signal data obtained based on the monitoring of network traffic exchanged with the servers, comprises an estimated saturation level of each of the servers.

8. The non-transitory computer readable medium of claim 6, wherein the executable code, when executed by the processors, further causes the processors to:

determine when there is a predicted server health anomaly based on the application of the server health prediction model to the signal data; and initiate a mitigation action when the determination indicates that there is a predicted server health anomaly.

9. The non-transitory computer readable medium of claim 6, wherein the signal data comprises one or more of transactions per second, requests per second, request jitter, response jitter, drops per second, pending transactions per second, bytes in per second, bytes out per second, upload time, download time, idle time, inter-packet time, or response codes.

10. The non-transitory computer readable medium of claim 6, wherein the executable code, when executed by the processors, further causes the processors to determine when a specified number or one or more specified ones of the threshold values has been exceeded.

11. A health analysis apparatus, comprising memory comprising programmed instructions stored thereon and one or more processors configured to be capable of executing the stored programmed instructions to:

monitor network traffic exchanged with a plurality of servers to obtain signal data regarding a plurality of signals associated with the network traffic;

apply a server health prediction model to the signal data to generate a server health score for each of the servers, the server health prediction model comprising a plurality of predictive health targets each based at least in part on historical signal data and having an associated threshold value, the historical signal data obtained based on an analysis of monitored network traffic exchanged between one or more of a plurality of clients and one or more of the servers; and update a stored load balancing policy based on the generated server health score for each of the servers to modify a distribution across the servers of network traffic received from the clients.

12. The health analysis apparatus of claim 11, wherein the server health score for each of the servers, which is generated based the application of the server health prediction model to the signal data obtained based on the monitoring of network traffic exchanged with the servers, comprises an estimated saturation level of each of the servers.

13. The health analysis apparatus of claim 11, wherein the processors are further configured to be capable of executing the stored programmed instructions to:

determine when there is a predicted server health anomaly based on the application of the server health prediction model to the signal data; and initiate a mitigation action when the determination indicates that there is a predicted server health anomaly.

14. The health analysis apparatus of claim 11, wherein the signal data comprises one or more of transactions per second, requests per second, request jitter, response jitter, drops per second, pending transactions per second, bytes in per second, bytes out per second, upload time, download time, idle time, inter-packet time, or response codes.

15. The health analysis apparatus of claim 11, wherein the processors are further configured to be capable of executing the stored programmed instructions to determine when a specified number or one or more specified ones of the threshold values has been exceeded.

16. A network traffic management system, comprising one or more health analysis apparatuses, a plurality of client devices, and a plurality of server devices, the network traffic management system comprising memory comprising programmed instructions stored thereon and one or more processors configured to be capable of executing the stored programmed instructions to:

monitor network traffic exchanged with the server devices to obtain signal data regarding a plurality of signals associated with the network traffic;

apply a server health prediction model to the signal data to generate a server health score for each of the server devices, the server health prediction model comprising a plurality of predictive health targets each based at least in part on historical signal data and having an associated threshold value, the historical signal data obtained based on an analysis of monitored network traffic exchanged between one or more of the client devices and one or more of the server devices; and update a stored load balancing policy based on the generated server health score for each of the server devices to modify a distribution across the server devices of network traffic received from the client devices.

17. The network traffic management system of claim 16, wherein the server health score for each of the server devices, which is generated based the application of the server health prediction model to the signal data obtained based on the monitoring of network traffic exchanged with the server devices, comprises an estimated saturation level of each of the server devices.

18. The network traffic management system of claim 16, wherein the processors are further configured to be capable of executing the stored programmed instructions to:

determine when there is a predicted server health anomaly based on the application of the server health prediction model to the signal data; and initiate a mitigation action when the determination indicates that there is a predicted server health anomaly.

19. The network traffic management system of claim 16, wherein the signal data comprises one or more of transactions per second, requests per second, request jitter, response jitter, drops per second, pending transactions per second, bytes in per second, bytes out per second, upload time, download time, idle time, inter-packet time, or response codes.

20. The network traffic management system of claim 16, wherein the processors are further configured to be capable of executing the stored programmed instructions to determine when a specified number or one or more specified ones of the threshold values has been exceeded.

* * * * *